United States Patent
Davie

(10) Patent No.: US 9,591,731 B2
(45) Date of Patent: Mar. 7, 2017

(54) DC TRACK LIGHTING SYSTEMS CONTROL

(71) Applicant: PHILIPS LIGHTING HOLDING B.V., Eindhoven (NL)

(72) Inventor: Alan James Davie, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/031,193

(22) PCT Filed: Oct. 27, 2014

(86) PCT No.: PCT/EP2014/073000
§ 371 (c)(1),
(2) Date: Apr. 21, 2016

(87) PCT Pub. No.: WO2015/063029
PCT Pub. Date: May 7, 2015

(65) Prior Publication Data
US 2016/0255703 A1 Sep. 1, 2016

(30) Foreign Application Priority Data

Oct. 28, 2013 (EP) .................................... 13190411

(51) Int. Cl.
| | |
|---|---|
| H05B 37/02 | (2006.01) |
| H05B 39/04 | (2006.01) |
| H05B 41/36 | (2006.01) |
| H04B 5/00 | (2006.01) |
| H04B 3/54 | (2006.01) |
| F21V 21/34 | (2006.01) |

(52) U.S. Cl.
CPC ......... *H05B 37/0272* (2013.01); *F21V 21/34* (2013.01); *H04B 3/548* (2013.01); *H04B 5/0075* (2013.01); H04B 2203/547 (2013.01); H04B 2203/5416 (2013.01); H04B 2203/5445 (2013.01)

(58) Field of Classification Search
CPC ..... H05B 37/0272; F21V 21/34; H04B 3/548; H04B 5/0075
USPC .......................................... 315/294, 312, 34
See application file for complete search history.

(56) References Cited

U.S. PATENT DOCUMENTS

| | | | |
|---|---|---|---|
| 4,656,398 A | 4/1987 | Michael et al. | |
| 5,072,216 A | 12/1991 | Grange | |
| 2005/0231134 A1* | 10/2005 | Sid ..................... | H05B 37/0272 315/294 |

(Continued)

FOREIGN PATENT DOCUMENTS

| | | |
|---|---|---|
| JP | 2002234441 A | 8/2002 |
| JP | 2007174812 A | 7/2007 |

(Continued)

*Primary Examiner* — Daniel D Chang

(57) ABSTRACT

This invention generally relates to control of DC track lighting systems. The proposed solution implements a control system for a DC track lighting system based on the use of near-field RF technologies such as NFC. This solution is achieved by extending the limited range offered by near-field RF technologies by taking advantage of the unexpected behavior of a DC track while having thereon high frequency signals such as near-field RF signals. The proposed solution may require less tedious control of DC track lighting system since lamp holder(s) may be controlled based on a single "touch" of near-field RF enable device.

17 Claims, 3 Drawing Sheets

(56) References Cited

U.S. PATENT DOCUMENTS

2013/0342326 A1* 12/2013 Wang ................... H04Q 9/00
340/10.1
2014/0239816 A1* 8/2014 Lee ................... H05B 33/0842
315/130

FOREIGN PATENT DOCUMENTS

| JP | 2008042999 A | 2/2008 |
| JP | 2008524918 A | 7/2008 |
| JP | 2008251502 A | 10/2008 |
| JP | 2009164924 A | 7/2009 |

* cited by examiner

DC TRACK LIGHTING SYSTEMS CONTROL

CROSS-REFERENCE TO PRIOR APPLICATIONS

This application is the U.S. National Phase application under 35 U.S.C. §371 of International Application No. PCT/EP2014/073000, filed Oct. 27, 2014, and European Application No. 13190411.2, filed Oct. 28, 2013. These applications are hereby incorporated by reference herein.

FIELD OF THE INVENTION

This invention generally relates to control of DC track lighting systems.

BACKGROUND OF THE INVENTION

DC track lighting systems are seen as part of the next generation of smart lighting solutions. Indeed, a DC track lighting system consists of a metal track powered by a linear power source to which one or more lamp holders may be attached at any point along the track. This arrangement offers great efficiency and flexibility to add, remove or reposition lamp holders.

Several solutions have been proposed to control such DC track lighting systems. For instance, systems which are compliant with the "Emerge Alliance" specification enable to control the DC track lighting system based on a low power wireless standard such as Zigbee which can range up to 100 m. In this case, every lamp in the system will need to be Zigbee enabled.

However, with the advent of near-field RF (radio frequency) communication technologies within mobile devices (e.g. smartphones, tablets), it is to be anticipated that their users will expect to be able to control a variety of products, equipments and systems with a simple "touch" action from their devices. Naturally, this is to be expected as well for controlling DC track lighting systems.

Notwithstanding the flexibility offered by near-field RF technologies, their range can usually only run up to several centimeters. Therefore, controlling one or more lamp heads of a DC track lighting system can be quite tedious since close proximity is required between the near-field RF controllers and lamp holder(s). Consequently, there it would be advantageous to provide means to control a DC track lighting system using near-field RF technologies.

SUMMARY OF THE INVENTION

The present subject application provides a system and a method of controlling a DC track lighting system using near-field RF technologies as described in the accompanying claims. Specific embodiments of the subject application are set forth in the dependent claims.

Certain embodiments of the subject application include a control system for a track lighting system powered by a DC power source and wherein the track lighting system comprises one elongated conducting track extending from a first end to a second end for supplying a DC voltage component of the DC power source to at least one lamp holder adapted to be attached to the track. The control system comprises a combining unit operable to produce a combined signal at the first end of the track based on at least the DC supply voltage and a received near-field radio frequency, RF, signal. The near-field RF signal comprises at least one control command adapted to control, through a communication adapter located at a first distance from the track between the first end and the second end, the operation of the at least one lamp wherein the first end is located at a second distance from the second end, the second distance being substantially greater than the first distance.

In embodiments of the subject application further include a communication adapter for use in the control system. The communication adapter comprises an inductive coupler adapted to be coupled inductively, at a given location along the track, with the magnetic field of the combined signal flowing onto the track. The communication adapter further comprises a processing unit coupled to the inductive coupler and operable to extract the control command from the inductively acquired combined signal.

Others embodiments of the subject application include a lamp holder in combination with the communication adapter. The lamp holder is operable to be coupled to the communication adapter. The lamp holder comprises a controlling unit adapted to control a lamp coupled therewith based on at least the control command.

In certain embodiments of the subject application, it is included a contactless communication apparatus in combination with the control system. The contactless communication comprises an inductive coupler coupled with a near-field RF signal transmitter operable to transmit a near-field RF signal through the inductive coupler.

Certain embodiments of the subject application also include a method of controlling a track lighting system powered by a DC power source wherein the track lighting system comprises at least one elongated conducting track extending from a first end to a second end for supplying a DC voltage component of the DC power source to at least one lamp holder adapted to be attached to the track. The method comprises producing a combined signal at the first end of the track based on the combination of at least the DC supply voltage and a received near-field radio frequency, RF, signal. The near-field RF signal comprises at least one control command adapted to control, through a communication adapter located at a first distance from the track between the first end and the second end, the operation of the at least one lamp holder, wherein the first end is located at a second distance from the second end, the second distance being substantially greater than the first distance.

These and other aspects of the subject application will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the subject application may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity, it will be quickly reminded that near-field RF communicators communicate through the modulation of the magnetic field generated by a radio frequency antenna. Thus, near-field RF communicators requires an antenna of one near-field RF communicator to be present within the alternating magnetic field generated by the antenna of another near-field RF communicator by transmission of a RF signal (e.g. a 13.56 MHz signal) to enable the magnetic field of the RF signal to be inductively coupled between the RF communicators. For instance, the RF signal may be modulated to enable communication of control and/or other data. Finally, as explained above, near-field RF communications can usually range up to several centimeters. Additionally, for the sake of simplicity and for a proper understanding of the subject application, following detailed description will consider NFC (Near Field Communication) standard as an exemplary near-filed technology. However, persons skilled in the art of communication systems will understand that the proposed solution may also be implemented in other near-field technologies having similar characteristics such as e.g. RFID (radio-frequency identification technology).

Figure 1:
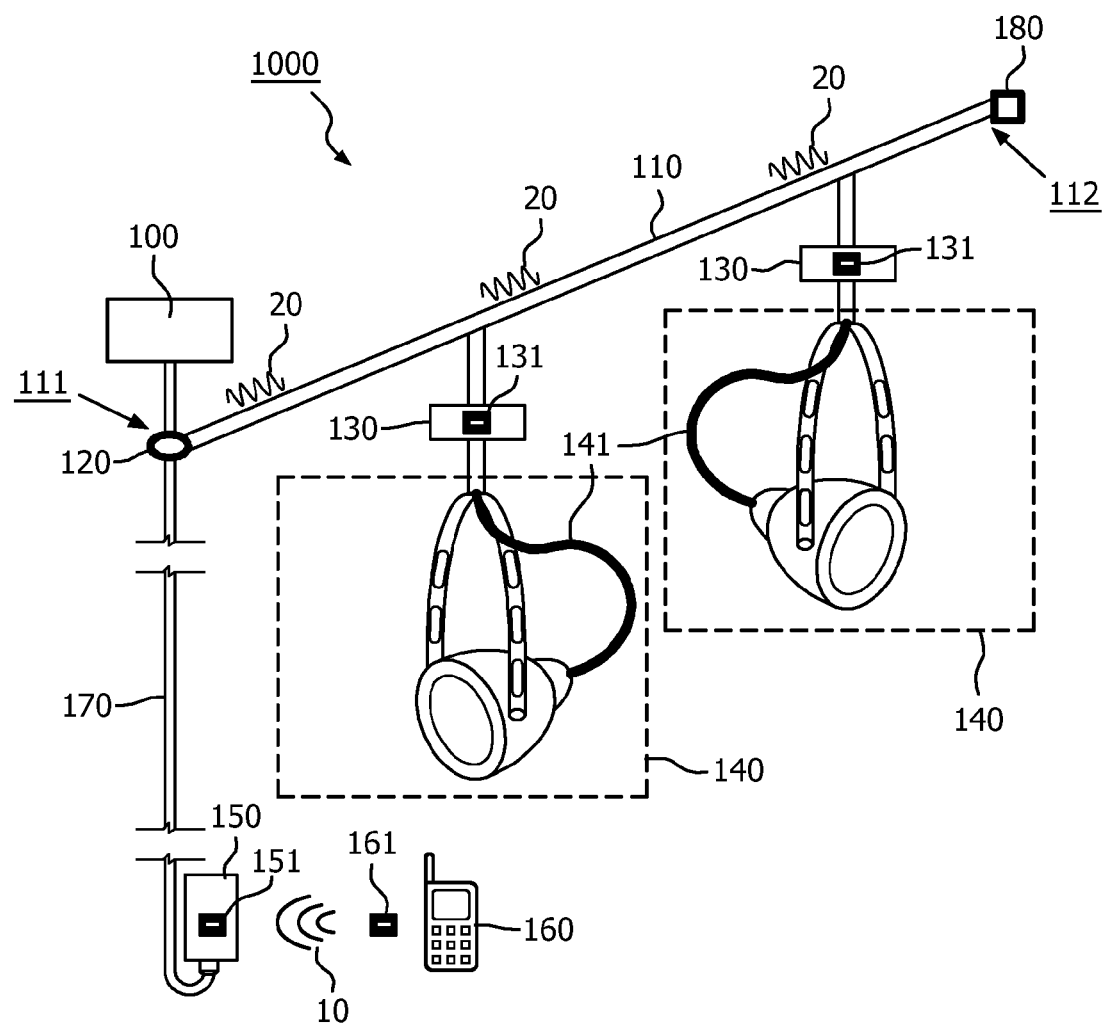
FIG. 1 is a schematic diagram of a DC track lighting system according to an embodiment of the subject application.

Referring to FIG. 1, there is diagrammatically shown therein an exemplary DC track lighting system 1000 according to an embodiment of the subject application. The DC track lighting system 1000 as shown comprises:

one DC power source 100;
one elongated conducting track 110;
one combining unit 120;
one or more communication adapters 130;
one or more lamp holders 140 such as lamp sockets adapted to be attached to the track 110;
one near-field RF signal provider 150; and,
one contactless communication apparatus 160, such as a smartphone or a tablet.

In the example of FIG. 1 as shown, the DC power source 100 may correspond to conventional DC power sources used to power track lighting systems. For instance, the DC power source 100 may include an AC to DC converter or transformer to convert an incoming high voltage (e.g. 110V/220V) from an AC power supply to a low voltage (e.g. 24V).

As shown in FIG. 1, the elongated conducting track 110 extends from a first end 111 to a second end 112 wherein the first end 111 is located at a predetermined distance from the second end 112. In an embodiment, the predetermined distance is substantially greater than the range achievable by near-field RF technologies such as NFC. The elongated conducting track 110 is typically but not limitatively of an electrically conducting material such as aluminium. The track 110 is operable to supply a DC voltage component of the DC power source to at least one lamp holder 140 adapted to be attached to the track 140. In examples of embodiments, the track 110 may comprise a first conducting rail member adapted to be connected to a reference potential such as ground and a second conducting rail member adapted to be connected to the DC power source 100. For example, the first and second conducting rail members may be parallel to, and spaced by a desired distance from, each other. In other examples of embodiments, a matched terminating load 180 may be operably coupled to at e.g. the second end 112 of the track 110, wherein the impedance of the matched load equals the characteristic impedance of the track 110. Such arrangement may be used to form a contained electromagnetic field in order to minimise standing waves and to provide for substantially constant electromagnetic field onto the track 110.

In FIG. 1, the DC track lighting system 1000 is adapted to be controlled by a control system comprising at least the combining unit 120. Indeed, the combining unit 120 is operable to produce a combined signal 20 at e.g. the first end 111 of the track based on at least the DC supply voltage and a received NFC signal. The NFC signal 10 comprises at least one control command adapted to control the operation of at least one lamp holder 140. Forgoing control is performed through the communication adapter 130 which is located at a given distance from the track 110 between the first end and the second end. For example, the given distance may correspond to the range achievable by near-field RF technologies such as NFC (e.g. few centimeters). In an embodiment, the given distance is substantially lower than the predetermined distance existing between the first end 111 and the second end 112 of track 110.

To summarise, the foregoing problem may be solved by extending the limited range provided by NFC. This is made possible by exploiting the unintentional transmission line characteristics of track 110. Indeed, experiments have shown that the track 110 is acting as a transmission line while conveying high frequency signals (e.g. 10 MHz, 13.56 MHz, 20 MHz and 30 MHz) such as those used in near-field RF technologies. Therefore, it appears that AC signals such as NFC signals may be transmitted over the conducting track 110 which was originally only designed to carry DC signals.

Referring to the example of FIG. 1 as shown, the combining unit 120 is operably coupled to the DC power source 100, the track 110 and a communication interface 170 which is adapted to carry the NFC signal 10 20. In examples of embodiments, the combining unit 120 may be an AC/DC combiner such as a biasing T-junction (i.e. bias-T network). Namely, the combining unit 120 may be operable to linearly couple the DC supply voltage originating from the DC power source 100 with the NFC signal 10 and to further output the resulting combined signal 20 onto the track 110.

Figure 2A:
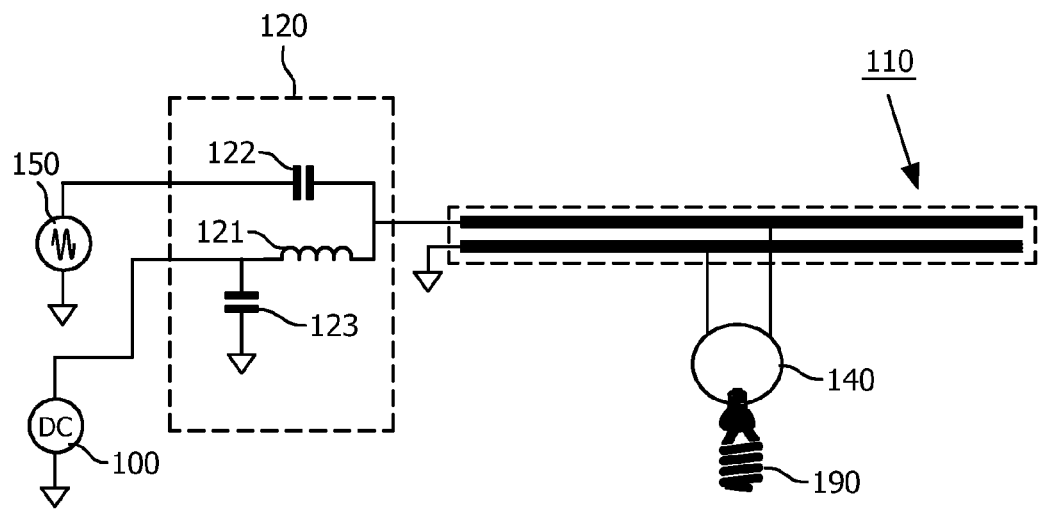
FIG. 2A-2B are schematic block diagrams of a combining unit in accordance with the subject application.

Referring now FIG. 2A, there is diagrammatically shown therein an exemplary block diagrams of the combining unit 120 in accordance with an embodiment of the subject application. The combining unit 120 as shown comprises one inductor 121, a first capacitor 122 and a second capacitor 123. Namely, the first capacitor 122 is used to prevent the NFC signal 10 from entering the DC power source 100 while the combination of inductor 121 and the second capacitor 123 is used to prevent the DC current from entering the near-field RF signal provider 150. In the example of FIG. 2A, the combining unit 120 is preferably, but not limitatively, coupled to the track 110 at one its end 111, 112.

Figure 2B:
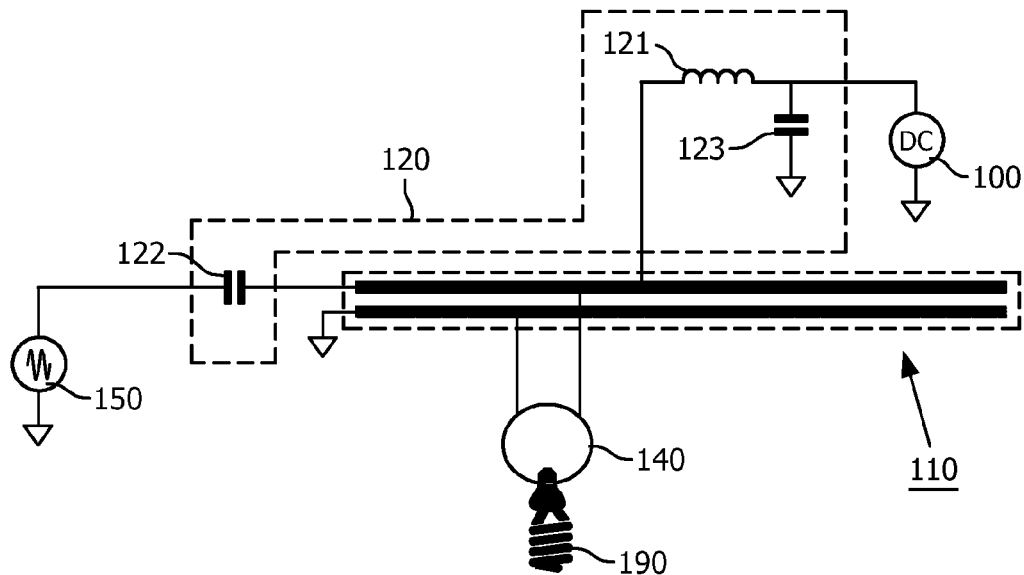

Referring now FIG. 2B, there is diagrammatically shown therein another exemplary block diagrams of the combining unit 120 in accordance with another embodiment of the subject application. The combining unit 120 as shown comprise the same components as described above in FIG. 2A. However in FIG. 2B, the components 121, 122 and 123 are distributed along the track 110. Namely, the first capacitor 122 is located between the near-field RF signal provider 150 and one end of the track 110 in order to prevent the NFC signal 10 from entering the DC power source 100. In contrast, the combination of inductor 121 and the second capacitor 123 is located along the track between the DC power source 100 and the track 110 in order to prevent the DC current from entering the near-field RF signal provider 150. In the example of FIG. 2B, the components of the combining unit 120 are distributed along the track. This arrangement thus enable the DC power source be located anywhere along the track 110. In this embodiment the combining unit would combine the NFC signal 10 with the DC supply voltage flowing onto the track 110.

Referring back to FIG. 1, the communication interface 170 is operably coupled at one end to the combining unit 120 and at the other end to the near-field RF signal provider 150. In examples of embodiments, the communication interface may be a coaxial cable or a twisted pair cable which may be suitable for carrying high frequency signals such as NFC signals. In FIG. 1 as shown, the near-field RF signal provider 150 comprises a first inductive coupler 151 adapted to be coupled inductively with the magnetic field a NFC signal 10 being transmitted through a second inductive coupler 161 external to the near-field RF signal provider 150. For instance, the second inductive coupler may be comprised in the contactless communication apparatus 160 along with at least a NFC transmitter operable to transmit the NFC signal 10 through the second inductive coupler 161. In an example, the first inductive coupler 151 may be located at a chosen distance from the second inductive coupler 161 wherein the chosen distance is substantially equal to the predetermined distance existing between the first end 111 and the second end 112 of track 110. In examples of embodiments, the inductive couplers 151, 161 may be an antenna that is configured to be exposed to a NFC signal 10 and modulate the received NFC signal 10 such that the modulated signal can be received by a corresponding transceiver.

Base on the foregoing, where the DC track lighting system 100 is in operation, a user of the contactless communication apparatus 160 may generate a NFC "touch" event by approaching the contactless communication apparatus 160 at close-proximity to the near-field RF signal provider 150. In response to the NFC "touch" event, the NFC signal 10 would be inductively coupled between the first inductive coupler 151 and the second inductive coupler 161. Later, the NFC signal 10 would be conveyed through the communication interface 170 to the combining unit 120 wherein the NFC signal 10 would be linearly combined with the DC supply voltage originating from the DC power source 100, in order to output the resulting combined RF signal 10 onto the track 110. Further, it is known by skilled person in the field of wireless communication that at least part of the RF energy carried by the track and associated with the combined signal 20 is radiated outwardly from the track 110 which is thus acting as a transmission line.

Referring back to FIG. 1, the communication adapter 130 for use in the control system is located at a given distance from the track 110 and comprises:

a third inductive coupler 131 adapted to be coupled inductively, at a given location along the track 110, with the magnetic field of the combined signal 20 flowing onto the track.

In examples of embodiments, the inductive coupler 131 may be an antenna that is configured to be exposed to a NFC signal 10 and modulate the received NFC signal 10 such that the modulated signal can be received by a corresponding transceiver. Consequently, the communication adapter is able to acquire at least part of the combined signal 20.

Further, the communication adapter 130 also comprises:

a processing unit such as a microprocessor or a microcontroller, coupled to the third inductive coupler 131 and operable to extract the control command from the inductively acquired combined signal 20. Indeed, as said above, the NFC signal 10 comprised in the combined signal 20, comprises at least one control command adapted to control the operation of at least one lamp holder 140.

In the example of FIG. 1, the lamp holder 140 is operable to be coupled to the communication adapter 130. Namely, the lamp holder may be a conventional lamp holder that may be adapted to be operably coupled in combination with communication adapter 130. However, in example of embodiments, the lamp holder 140 may also be a single unit comprising the communication adapter 130 such that the whole unit is adapted to be attached to the track 110. Referring to FIG. 1, the lamp holder comprises at least one connection line 141 that may be used to convey the DC voltage off the track 110 in order to power the lamp holder 140. For example, the connection line 141 may also be used to carry the control command. Further, the lamp holder 140 may comprise a controlling unit adapted to control a lamp 190 coupled therewith based on at least the control command. For example, the control command may comprise a turn off command, a turn on command, a dimming level command or a colour command. However, skilled person in the field of track lighting systems would appreciate that other type of commands may be contemplated without departing from the scope of the subject application. While in example of embodiments the control command may be directed to a single lamp holder 140, it may also be directed to a group of lamp holders 140. The later feature is highly dependent on the used near-field RF standard. For instance, NFC standard in its current version does not support multicast such that it is not possible to send a control command to a group of lamp holders 140. In contrast, RFID standard is able to do so as multicast is available in that standard. Whether one wants to use the NFC standard to multicast control commands, there may be a possibility to achieve this objective, for example by using a NFC/RFID converter. In this embodiment, lamp holders 140 should be RFID enabled since RFID signal would be send onto the track. The NFC/RFID converter would produce a RFID signal based on the NFC signal 10 along with some additional multicast information. Such additional multicast information may have been determined by a software application located on a NFC enabled device wherein a user may have selected a list of lamp holders 140 to control.

Figure 3:
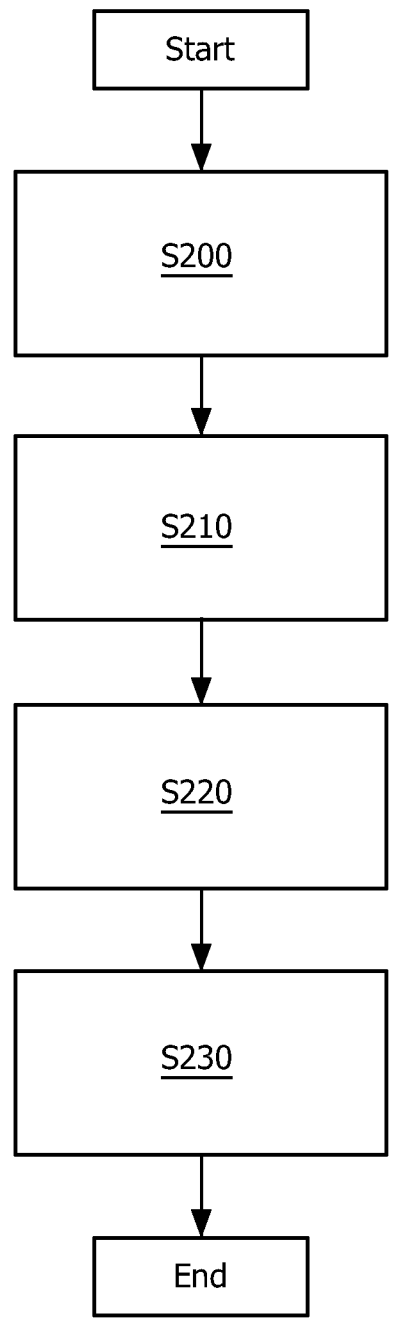
FIG. 3 is a schematic flow diagram of a method according to an embodiment of the subject application.

Referring now to FIG. 3, there is diagrammatically shown therein a flow diagram of a method according to an embodiment of the subject application and with regard to the control system of the DC track lighting system of FIG. 1.

In S200, it is produced the combined signal 20 based on the NFC signal 10 and the DC supply voltage as already explained above for example at the level of the combining unit 120. Later, the combined signal 20 is transmitted over the track 110 which acts as a transmission line.

In S210, it is inductively acquired at least part of the magnetic field of the combined signal 20 flowing onto the track 110, for instance at the level of the communication adapter 130 as already explained above.

Then, in S220 it is extracted from the inductively acquired magnetic field of the combined signal 20, at least one control command as already explained above, for example at the level of the communication adapter 130.

In S230, it is controlled at least one lamp holder 140 based on the extracted control command as already explained above, for instance at the level of the lamp holder 140.

The skilled person would appreciate that the proposed solution implements a control system for a DC track lighting system based on the use of near-field RF technologies such as NFC. This solution is achieved by extending the limited range offered by near-field RF technologies. Indeed, one should appreciate that the subject application takes advantage of the unexpected characteristics of a DC track which may behave has a transmission line while having flowing thereon high frequency signals such as near-field RF signals. The proposed solution may require less tedious control of DC track lighting system since one or more lamp holders may be controlled based on a single "touch" of near-field RF enable device. Additionally, wireless pollution and interference may be reduced since the control signal only radiates along the track and not throughout a room for instance.

Of course, the above advantages are exemplary, and these or other advantages may be achieved by the proposed solution. Further, the skilled person will appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The subject application scope is defined in the following claims and the equivalents thereto. Furthermore, reference signs used in the description and claims do not limit the scope of the subject application as claimed

The invention claimed is:

1. A control system comprising a track lighting system powered by a DC power source, the track lighting system comprising at least one elongated conducting track extending from a first end to a second end for supplying a DC supply voltage component of the DC power source to at least one lamp holder adapted to be attached to the track, the control system comprising:
 a combining unit configured to:
  combine the DC supply voltage component and, at least, a received near-field radio frequency, RF, signal, thereby producing a combined signal, the near-field RF signal comprising at least one control command; and,
  transmit the combined signal at the first end of the track, so as to inductively control the operation of the at least one lamp holder based on the control command.

2. The control system of claim 1, further comprising:
 a matched terminating load coupled to the second end of the track, wherein the impedance of the matched load equals the characteristic impedance of the track.

3. The control system of claim 1, wherein the track comprises a first conducting rail member connected to a reference potential and a second conducting rail member connected to the DC power source, the first and second conducting rail members being parallel to, and spaced by a first distance from, each other.

4. The control system of claim 1, further comprising a near-field RF signal provider operably coupled to the combining unit and adapted to provide the near-field RF signal.

5. The control system of claim 4, wherein the near-field RF signal provider comprises:
 a first inductive coupler adapted to be coupled inductively with a magnetic field of the near-field RF signal being transmitted through a second inductive coupler external to the near-field RF signal provider; and,
 a communication interface enabling the coupling with the combining unit and adapted to convey the received near-field RF signal.

6. The control system of claim 5, further comprising a contactless communication apparatus, the contactless communication apparatus comprising the second inductive coupler coupled with a near-field RF signal transmitter operable to transmit the near-field RF signal through the second inductive coupler.

7. A communication adapter, for the control system of claim 5, comprising:
 a third inductive coupler adapted to be coupled inductively, at a given location along the track, with a magnetic field of the combined signal flowing onto the track, to produce an inductively-acquired combined signal; and,
 a processing unit coupled to the third inductive coupler and operable to extract the control command from the inductively acquired combined signal.

8. The communication adapter of claim 7 being further adapted to be located at a third distance from the track between the first end and the second end, wherein, the first end is located at a fourth distance from the second end, the fourth distance being substantially greater than the third distance.

9. The communication adapter of claim 1, further comprising a lamp holder operably coupled to the communication adapter, the lamp holder comprising a controlling unit adapted to control a lamp coupled therewith based on at least the control command.

10. A method of controlling a track lighting system powered by a DC power source, the track lighting system comprising at least one elongated conducting track extending from a first end to a second end for supplying a DC supply voltage component of the DC power source to at least one lamp holder adapted to be attached to the track, the method comprising:

combining the DC supply voltage component and, at least, a received near-field radio frequency, RF, signal, thereby producing a combined signal, the near-field RF signal comprising at least one control command;

transmitting the combined signal at the first end of the track, so as to inductively control the operation of the at least one lamp holder based on the control command.

11. The method of claim 10, further comprising: terminating the second end of the track with a matched load having an impedance which equals the characteristic impedance of the track.

12. The method of claim 10, further comprising:

inductively acquiring, at a given location along the track, a magnetic field of the combined signal flowing onto the track; and, extracting the control command from the acquired combined signal.

13. The method of claim 10, wherein the control command comprising a turn off command, a turn on command, a dimming level command or a color command.

14. The method of claim 10, wherein the control command is directed to a single lamp holder.

15. The method of claim 10, wherein the control command is directed to a group of lamp holders.

16. A track lighting system powered by a DC power source, the track lighting system comprising:

at least one elongated conducting track extending from a first end to a second end for supplying a DC supply voltage component of the DC power source to at least one lamp holder adapted to be attached to the track; and a control system comprising a combining unit configured to:

combine the DC supply voltage component and, at least, a received near-field radio frequency, RF, signal, thereby producing a combined signal, the near-field RF signal comprising at least one control command; and, transmit the combined signal at the first end of the track, so as to inductively control the operation of the at least one lamp holder based on the control command.

17. The track lighting system of claim 16, further comprising a communication adapter comprising:

an inductive coupler adapted to be coupled inductively, at a given location along the track, with a magnetic field of the combined signal flowing onto the track, to produce an inductively-acquired combined signal; and a processing unit coupled to the inductive coupler and operable to extract the control command from the inductively acquired combined signal.

\* \* \* \* \*